United States Patent
Griessler et al.

(10) Patent No.: US 7,231,303 B2
(45) Date of Patent: Jun. 12, 2007

(54) VIBRATION SENSOR AND METHOD FOR MONITORING THE CONDITION OF ROTATING COMPONENTS AND BEARINGS

(75) Inventors: Erich Griessler, Rosenheim (DE); Peter Herberholz, Kolbermoor (DE); Benno Kathan, Wasserburg (DE); Thomas May, Constance (DE); Christian Bauer, Dietersburg (DE); Michael Danitschek, Stephanskirchen (DE)

(73) Assignee: i-for-T GmbH, Rosenheim (DE)

( * ) Notice: Subject to any disclaimer, the term of this patent is extended or adjusted under 35 U.S.C. 154(b) by 192 days.

(21) Appl. No.: 10/511,032

(22) PCT Filed: Apr. 14, 2003

(86) PCT No.: PCT/EP03/03731

§ 371 (c)(1),
(2), (4) Date: Feb. 3, 2005

(87) PCT Pub. No.: WO03/095956

PCT Pub. Date: Nov. 20, 2003

(65) Prior Publication Data
US 2005/0155429 A1    Jul. 21, 2005

(30) Foreign Application Priority Data
Apr. 13, 2002 (DE) .............................. 102 16 575
Jun. 25, 2002 (DE) .............................. 102 28 389

(51) Int. Cl.
*G06F 11/30* (2006.01)
*G06F 19/00* (2006.01)

(52) U.S. Cl. .................... 702/34; 702/56; 702/182; 73/593; 73/602

(58) Field of Classification Search .............. 702/33, 702/34, 56, 77, 104, 183, 188, 189, 199, 702/182; 73/593, 587, 660, 661, 602
See application file for complete search history.

(56) References Cited

U.S. PATENT DOCUMENTS

| | | | |
|---|---|---|---|
| 4,289,382 A | 9/1981 | Clark | |
| 5,109,700 A | 5/1992 | Hicho | |
| 5,115,671 A * | 5/1992 | Hicho | 73/488 |
| 5,511,422 A | 4/1996 | Hernandez | |
| 5,597,532 A | 1/1997 | Connolly | |
| 6,053,047 A | 4/2000 | Dister et al. | |
| 6,297,742 B1 | 10/2001 | Canada et al. | |

(Continued)

FOREIGN PATENT DOCUMENTS

DE        44 06 723 B4     9/1994

(Continued)

*Primary Examiner*—Bryan Bui
(74) *Attorney, Agent, or Firm*—David S. Safran

(57) ABSTRACT

A vibration sensor (1) for monitoring the state of rotating components or bearings, includes a housing (2), a sensor element (3), evaluation electronics (4), and at least one interface (5, 6). With the vibration sensor (1), reliable monitoring of the state of rotating components and bearings can be done easily and economically, and in addition the vibration sensor can be easily operated. The evaluation electronics (4) has an analog-to-digital converter (7), and a signal conditioning device (8) having a plurality of signals, which have been acquired by the sensor element (3), and which are converted into a state value using signal analysis and a diagnosis algorithm.

22 Claims, 4 Drawing Sheets

U.S. PATENT DOCUMENTS

| | | |
|---|---|---|
| 6,331,823 B1 | 12/2001 | El-Ibiary |
| 6,498,992 B1 | 12/2002 | Toyota et al. |
| 6,526,829 B1 | 3/2003 | Lysen et al. |
| 6,546,814 B1 | 4/2003 | Choe et al. |
| 6,694,285 B1 * | 2/2004 | Choe et al. .................. 702/182 |
| 2004/0055398 A1 | 3/2004 | Weyer et al. |

FOREIGN PATENT DOCUMENTS

| | | |
|---|---|---|
| DE | 197 55 924 C2 | 7/1999 |
| DE | 199 24 351 C2 | 12/1999 |
| DE | 199 02 326 C2 | 8/2000 |
| DE | 199 45 008 A1 | 3/2001 |

* cited by examiner

VIBRATION SENSOR AND METHOD FOR MONITORING THE CONDITION OF ROTATING COMPONENTS AND BEARINGS

BACKGROUND OF THE INVENTION

1. Field of the Invention

The invention relates to a vibration sensor for monitoring the state of rotating components or bearings, with a sensor element, with evaluation electronics and with at least one interface. In addition the invention also relates to a process for monitoring the state of rotating components or bearings with a vibration sensor which has a sensor element and evaluation electronics.

2. Description of Related Art

In mechanical engineering and plant engineering there are a host of machines and systems which each have rotating components, generally a shaft. The shaft is supported via a bearing, especially a roller bearing, in the stationary housing of the machine or equipment. Depending on the embodiment, the inside ring or the outside ring of the bearing being movably arranged, while then accordingly the inside ring or the outside ring is supported to be stationary. Problem-free serviceability of the bearing, as the force-transmitting component in motion, is decisive for the serviceability of the machine or system. Due to high dynamic and static loads in operation and as a result of structural limitations, the bearing often constitutes the "Achilles heel" of the machine or system. Thus, bearing defects are by far the most frequent cause of failure for electrical drives.

For this reason, there are a host of various sensors and methods for monitoring the state and for detection of bearing damage. In addition to measuring the temperature of the bearing and analyzing the bearing lubricants, especially of the bearing oil, mainly vibration-diagnostic methods are used to assess the state of the bearing. Using an acceleration sensor, the solid-borne noise signal of the bearing which is to be monitored on the machine surface is detected and analyzed. In doing so, however, simple characteristic values of the vibration signal, such as the effective value, the peak value or the quantitative average, do not allow reliable conclusions about the state of the monitored bearing. In particular, for early detection of damage, these characteristic values are completely unsuited. This is also due especially to complex operating conditions and to the host of bearings, which can be used, and which are used with their different dimensions and characteristic values.

Reliable early diagnoses of bearing damage or unbalanced masses of rotating components is therefore only possible with comprehensive evaluation of the high frequency signals delivered by the vibration sensor in the range up to a few kilohertz. The evaluation of these high frequency signals generally takes place using spectral signal analysis. In this way, it is not only possible to draw a conclusion regarding whether a bearing is intact or damaged, but a conclusion can also be drawn about the type of damage. Likewise a conclusion can be drawn about the expected remaining service life of the bearing. Although it is thus possible by measurement engineering to detect varied damage early, vibration sensors for monitoring the state of rotating components or bearings are used only rarely in practice.

The prior art in industrial monitoring of bearings is limited, on the one hand, to intermittent measurement with hand measuring instruments, and on the other hand, to the use of relatively expensive central measurement systems, which as a result of high procurement costs are feasible only for monitoring of high-value machines, such as turbines or large gear trains. Intermittent measurement with hand measuring instruments has the disadvantage that continuous checking of the state of the bearing does not take place, so that reliable early diagnosis of damage is not possible. Moreover, as a result of the different operating conditions, it is only possible with difficulty to draw a reliable conclusion about the state of the bearing from the different measured values. To do this, the corresponding expert know-how is necessary, resulting in high personnel expenditure and high costs.

In the implementation of a central measurement system, as a result of the large number of data to be evaluated, on the one hand, the cabling of the individual vibration sensors to the central data processing systems is complex, and on the other hand, due to the real time capacity, which is often required, very high demands are imposed on the central data processing system. In this case, the central data processing system for reasons of safety in addition is often having to be made redundant. But even with the use of a correspondingly powerful and high-speed data processing system, due to the large number of data to be evaluated, the number of sensors, which can be connected to the data processing system, is very limited, if the individual sensors are to be evaluated in real time and not only in a multiplexed process. Because the individual sensors must be connected to the central data processing system via separate lines, such a central measurement system has an expansion capacity, which is made very limited or has none at all. Thus, planning of a central measurement system requires thorough preparation, and machines and sensors, which may have to be added at a later time, having to be taken into account at the same time in the planning.

SUMMARY OF THE INVENTION

Therefore, an object of this invention is to embody and develop an exemplary vibration sensor and process, such that reliable monitoring of the state of rotating components and bearings can be done easily, and, thus, economically, and wherein the vibration sensor is to be operated in a simple a manner as possible.

The above and other objects are achieved in the initially described vibration sensor by the evaluation electronics having an analog-to-digital converter and a signal conditioning means, wherein the signal conditioning means includes a plurality of signals, which have been acquired by the sensor element, being converted into a state value using signal analysis and a diagnosis algorithm. By the integration and execution of the signal conditioning means, bearing diagnosis is integrated into the vibration sensor. By converting the plurality of measured signals using signal analysis and the diagnosis algorithm in a simple state value, expensive expert know-how for reliable bearing diagnosis and for detection of bearing damage need not be employed.

Basically, the sensor element, on the one hand, and the evaluation electronics and the interface, on the other hand, can be arranged in space separately from one another. This is especially the case when on the machine which is to be monitored there is only very little space for mounting of the vibration sensor, such that the sensor element is mounted on the machine, while the evaluation electronics is located spatially separated from the sensor element. The sensor element and the evaluation electronics are then connected to one another via an electrical line, but preferably the sensor element and the evaluation electronics are located in a common housing so that the vibration sensor is configured as a compact device.

According to one preferred embodiment, the vibration sensor includes a display means with a display and with at least one control element for parameter input and/or for setting the boundary values and/or for choosing the operating mode of the vibration sensor. Thus, simple indication of the determined state value is possible on site using the display so that the state of the monitored component or of the monitored bearing can be easily read out at any time. Using the control elements, on the one hand, the vibration sensor can be switched into the desired operating mode, and on the other hand, matching to the operating conditions present at the time by input of certain parameters or boundary values is possible. Preferably the display includes a color display having color values green, yellow and red, such that the respective state of the bearing and the deterioration of the bearing state can be indicated easily and distinctly.

In order to preclude manipulation of the parameters, which have been input using the control elements by an individual who is not authorized to do so, the control elements are made such that they can be locked or blocked mechanically and/or electronically. Mechanical locking can be made, for example, such that only after inserting a special key into a corresponding lock on the housing are the control elements activated. Alternatively, the control elements can be activated or deactivated electronically by means of a PC, such that manipulation security can also thus be ensured.

According to another preferred embodiment of the vibration sensor, the interface has at least one switching output, a parameterization input, and a current and voltage supply input. The interface can moreover also have a signal input for an external signal and a current or voltage supply output for an external sensor. Based on the parameterization input, for example, a simple PC-supported parameterization via a standard interface, such as an RS-232 interface, is possible.

In this way, user-friendly input and setting of all parameters relevant to monitoring, such as bearing data, rpm, boundary values, and operating function of the outputs, are possible on a PC, and the bearing data can be stored in the corresponding databases in the PC, such that the user need input only the corresponding type designation or characteristic values of the bearing and then all relevant data are transferred from the PC via the interface, as the parameter set to the vibration sensor. Likewise, a bearing database can also be filed in a memory, which is integrated into the vibration sensor, so that the operator in the parameter input from the database can easily select the correct characteristic values by input of the bearing size and of the manufacturer.

By the execution of a signal input for an external signal, the vibration sensor can continuously carry out state monitoring even when the rpm change. The information, which is routed to the signal input, about the current rpm can arrive either via an analog current signal (e.g., 4 to 20 mA) from the motor control of the rotating component or from an external sensor, for example, a proximity switch or pulse generator. Because there is also a current or voltage supply output, the current and voltage supply of an external sensor can take place via the vibration sensor or the current and voltage supply connection. In this way, a further reduction of the cabling cost is possible, since the external sensor need be connected only to the spatially adjacent vibration sensor and not to a spatially remote supply unit.

Advantageously, the interface has two switching outputs, which each can be switched as a break contact or a make contact, wherein one of the switching outputs is configured for triggering a pre-alarm, and the other switching output triggering is configured for the main alarm. Thus, in addition to the display, indication of the respective state of the rotating component or the bearing is also possible at a remote site, for example, a central monitoring site, via the switching outputs. The switching output, which triggers the main alarm, and which indicates damage, which adversely affects the serviceability of the rotating component and/or of the bearing, can be connected to an emergency stop switch of the machine and an optical and/or acoustic signal means.

The evaluation electronics, which is formed, for example, by a microprocessor, according to another preferred embodiment, has self-learning logic. Using this self-learning logic in which defined and preset damage patterns are compared continuously with the current measured values, self-learning damage pattern recognition is possible.

According to another embodiment of the vibration sensor, the vibration sensor is designed for state monitoring of several rotating components or bearings, wherein for each monitored component or for each bearing, the acquired signals are converted, using signal analysis and a diagnosis algorithm, into a state value, and the state value of the component or of the bearing with the greatest degree of damage, i.e., the poorest or most critical state value, is at the switching output of the vibration sensor. The evaluation electronics, thus, undertakes comparison of the state values of the individual monitored components and bearings, wherein only the "most critical" state value is sent to the switching output at one time. In this way, with the single vibration sensor, monitoring of several rotating components or bearings is possible, and expensive expert know-how for evaluation and diagnosis of the individual measured values need not be employed, since the relevant state is easily detected by the vibration sensor and is clearly displayed.

The sensor element is advantageously located on a circuit board, which has at least one rigid segment, and at least one flexible segment, such that the vibrations of the bearing, which is to be monitored, and which vibrations have been detected by the sensor element, are not superimposed or adversely affected by the natural vibrations of the housing. The sensor element is mounted with low attenuation in the housing in the vicinity of the mounting site of the vibration sensor. In this way, transmission of the solid-borne sound of the bearing, which is to be monitored, to the sensor element, which transmission is as optimum as possible, is ensured.

According to a last advantageous embodiment of the vibration sensor, the sensor element is a biaxial acceleration sensor, which is advantageously located at an angle of 45 degrees to the surface normal to the circuit board. These acceleration sensors, at present, can be produced relatively favorably, but they have a relatively high noise portion in the acceleration signal. In the aforementioned advantageous embodiment in which the acceleration signal is located turned by 45 degrees on the circuit board, the noise portion can be reduced by the output signals of the two channels (axes) of the acceleration sensor being added. In this way, on the one hand, the amplitude of the useful signal corresponds to one uniaxial sensor, and on the other hand, the amplitude of the noise portion is greatly reduced, since from each channel only half the noise amplitude is routed to the analog-to-digital converter.

In the exemplary process, an object of the invention is achieved in that the signals acquired by the sensor element are converted into a state value using signal analysis and a diagnosis algorithm. In doing so, the sensor element continuously or quasi-continuously acquires the signals, such that there is continuous monitoring of the state of the system. Signal analysis takes place, advantageously, both in the time domain and also in the frequency domain, by which high signal resolution can be achieved, such that, even under difficult operating conditions, reliable state monitoring can be accomplished.

In order to be able to process the host of measured signals with high precision, but still with computer cost as small as possible, there are various possibilities of signal analysis, which are used alternatively or preferably combined. Signal analysis can take place based on a Fourier transform (FT), a fast Fourier transform (FFT) or an envelope curve fast Fourier transform (HFFT). Such mathematical transform possibilities are modified, such that very fine spectral resolution is achieved. To do this, for example, a so-called zoom FFT can be used as frequency analysis by which the accuracy in frequency resolution (discrimination) is increased. Moreover, preferably intelligent dynamic scaling of the respective frequency band is implemented, by which the accuracy is increased for the amplitudes.

To prevent anti-aliasing problems, the frequency range is limited using an analog filter. Preferably the boundary values of the filter can be variably set depending on the operating conditions or can be automatically matched themselves to altered operating conditions. Then analog-to-digital conversion takes place, for example, using a sigma-delta converter, such that the measured analog signals can be digitally processed in the evaluation electronics.

In order to be able to evaluate the large number of measured values with reasonable effort and in real time, dynamic quantitative averages and peak values are computed in the time domain. Parallel thereto in the frequency domain, the values, which are supplied to signal analysis, are manipulated, i.e., individual signals are weighted and/or filtered and/or windowed and/or modulated.

Using a diagnosis algorithm, individual signals are combined into characteristic values, which are compared to boundary values, wherein individual signals are weighted according to their relevance. Computation of the individual characteristic values is done depending on the stored and/or computed parameter data so that the exemplary process can be used for different components and different bearings. The individual characteristic values are then likewise combined, with consideration of different weighting and with consideration of the operating state, into a state value, which is output by the vibration sensor.

If damage occurs on one of the components of the bearing, i.e., on the inside ring, on the outside ring or on the roller body, this is measured by the vibration sensor by an altered solid-borne noise signal. Different "damage frequencies" are assigned to the individual components. In systems in which a host of broadband vibrations occur, there is the danger that the vibration sensor detects the "damage frequency" of a component of the bearing, which originates from the superposition of a vibration from the system, and not from a fault of the component of the bearing, which has actually occurred. Therefore, advantageously, in the exemplary process, to produce a reliable damage conclusion, the signals, which have been measured for the individual components of the bearing, are combined into a characteristic value. If the characteristic values are not computed in the vibration sensor in isolation for the individual components of the bearings, but, as stated above, are determined by the corresponding averaging or weighting of the signals of at lest two components of the bearing, the danger of occurrence of a false alarm by the superposition of external vibrations is reduced.

Using the above described diagnosis algorithm, thus, the host of signals, which have been measured altogether, are combined into some characteristic values, wherein the individual characteristic values represent the different types of damage of the rotating component or of the bearing. In the computational combination of the individual signals into the characteristic values, the varied relevance of individual signals, under different operating conditions and for different parameter data, which have been input beforehand, can be considered.

According to another advantageous embodiment of the exemplary process, the characteristic values and/or the state value is subjected to plausibility checking, such that measurement errors are recognized and a faulty state value is not output. In the plausibility checking of the characteristic values and/or of the state value, it is taken into account that the damage, which occurs on the rotating component or on the bearing, does not generally occur spontaneously, but arises and grows over the course of time, such that, by comparing the characteristic values and/or the state value at a past time to the current characteristic value and/or the current state value, a measurement error can be ascertained.

According to a preferred embodiment, in the exemplary vibration sensor and process, the vibration sensor has different operating modes. In a teach-in mode, the boundary values are automatically computed by the evaluation electronics, depending on the parameterization data and the current operating conditions. In such an automatic self-learning process, at the start of monitoring of the state, the current measurement values are stored, as the reference values, such that when the reference values diverge from the measured values, which are theoretically expected based on parameter data, automatic matching of the selected boundary values can take place.

According to a preferred configuration, the teach-in mode, as an additional operating mode, includes teaching of the response characteristic between the rotating component or the bearing and the vibration sensor. The response characteristic is dependent on the respective conditions of use of the vibration sensor, especially on the mass and geometry of the rotating component, and on the damping behavior of the materials used. In order to determine the actual response characteristic, advantageously, at the start of monitoring of the state, at least one defined pulse, in the three-dimensional vicinity of the rotating component, is fed into the machine, and a response characteristic is determined from the signal, which has been measured by the vibration sensor based on the pulse. The pulse can be produced, either simply by a corresponding tool, for example, an impact punch, or by a mobile apparatus. If instead of a simple tool a mobile apparatus is used, different pulses with different frequencies and amplitudes can be produced, such that the response characteristic can be determined over a larger frequency range.

The state monitoring is also possible at a different rpm, wherein boundary values, which have been computed or input beforehand, are automatically adapted to the respective rpm. In this case, the teach-in mode need therefore be carried out only for a typical operating rpm, wherein, at a different rpm, the corresponding boundary values are then automatically computed by the evaluation electronics, such that the teach-in mode need not be carried out for each possible operating rpm.

According another advantageous embodiment of the exemplary process, the determined state values are continuously stored, and based on the previously determined state values, a computation of the expected time interval (remaining service life) until occurrence of damage, which adversely affects the serviceability of the rotating component and/or of the bearing, is determined. In this way, not only is the current state of the monitored component or the monitored bearing displayed to the user, but the latter also acquires information about how long the monitored machine or equipment can continue to be operated and when repair or replacement of the bearing must be done before damage or failure of the machine or equipment can be expected.

In particular, there is now a host of possibilities for embodying and developing the exemplary vibration sensor and process, wherein reference is made to the claims and the description of the exemplary embodiments taken in conjunction with the drawings.

DETAILED DESCRIPTION OF THE INVENTION

Figure 1:
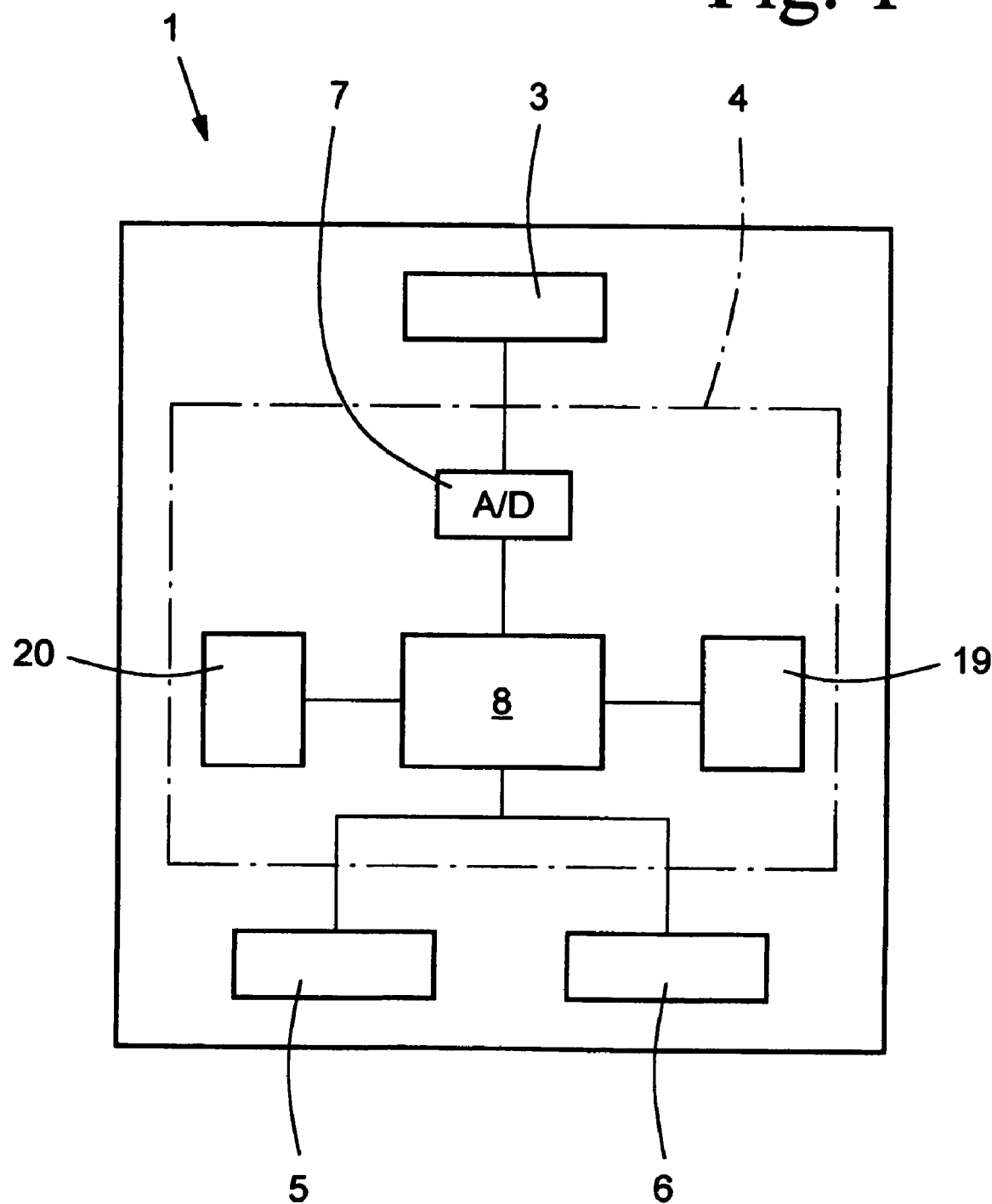
FIG. 1 shows a schematic block diagram of a vibration sensor as claimed in the invention.

The figures show a vibration sensor 1 with a plastic or aluminum housing 2, with a sensor element 3, which is located in the housing 2, and with evaluation electronics 4, and with two interfaces 5, 6, and which is shown schematically in FIG. 1. The evaluation electronics 4, includes an analog-to-digital converter 7, which is connected to the sensor element 3, and a signal conditioning means 8, which is connected to the analog-to-digital converter 7. The signal conditioning means 8 is generally implemented by a microprocessor, which can form the evaluation electronics 4, such that the analog-to-digital converter 7 is integrated in the microprocessor.

Figure 2:
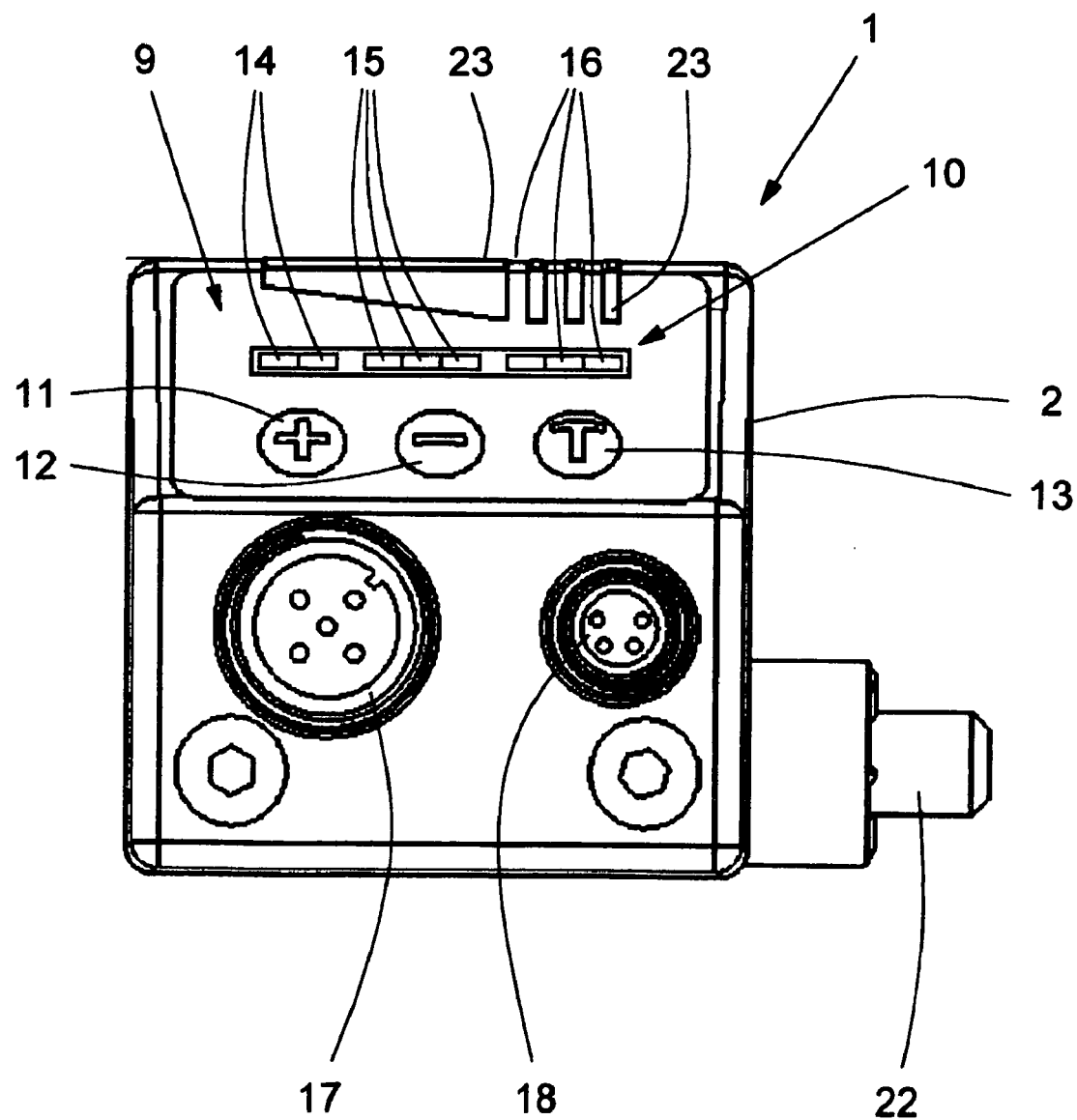
FIG. 2 shows a concrete embodiment of the vibration sensor as claimed in the invention, in a front view.

As can be recognized from FIG. 2, the vibration sensor 1 has a display means 9 with a display 10 and three control elements 11, 12, 13. The control elements 11 and 12 are used for setting boundary values, wherein when these boundary values are reached, a pre-alarm or main alarm is triggered by the vibration sensor 1. Moreover, the operating mode and/or the display mode of the vibration sensor 1 can also be selected via the controls 11, 12. The control element 13 is used to start the teach-in mode in which the vibration sensor 1 is automatically matched to the current operating conditions after completed parameterization in the installed state.

The display 10, according to the preferred embodiment, is a color display, including several green LEDs 14, several yellow LEDs 15, and several red LEDs 16. Via the first green LED 14, proper power supply of the vibration sensor 1 is displayed, while via the second green LED 14, the operating status of the vibration sensor can be displayed (parameterization, teach-in mode, monitoring mode). Using several yellow LEDs 15, the progress of the degree of damage of the monitored component or of the monitored bearing is indicated. Depending on the setting of the boundary values, a pre-alarm is output parallel to the display via a yellow LED 15. Via the red LEDs 16, the damage of a component or of a bearing is displayed, wherein with the vibration sensor 1 several bearings are able to be monitored at the same time, so that the individual red LEDs 16 are assigned to the individual bearings. Parallel to lighting of a red LED 16, the main alarm is output via the interface 5.

Figure 3:
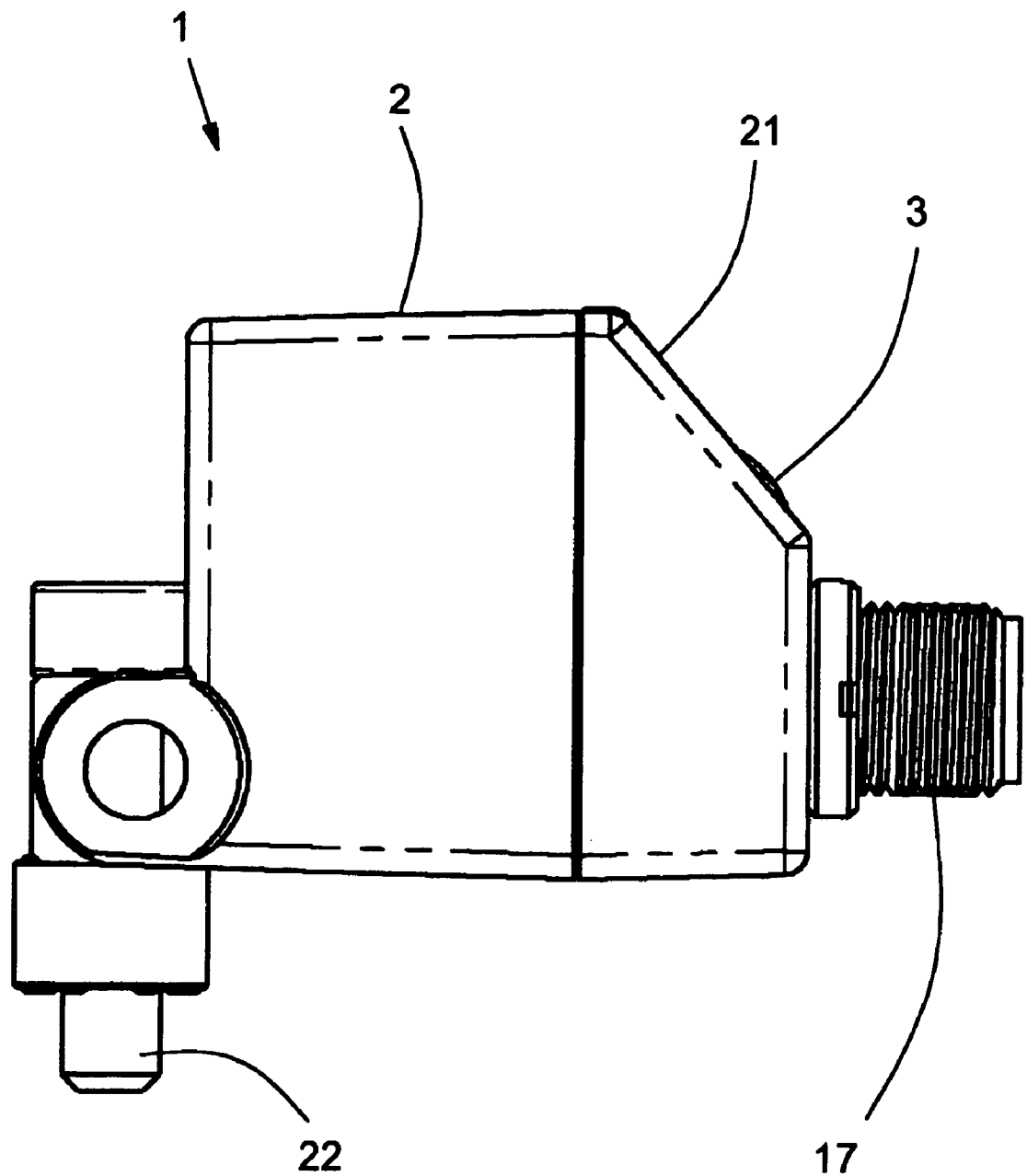
FIG. 3 shows a second concrete embodiment of the vibration sensor as claimed in the invention, in a side view.

The interfaces 5, 6 are shown in FIGS. 2 and 3 and are implemented by two plug connectors 17, 18, wherein the two interfaces 5, 6 can be configured as RS 232 interfaces, and the two plugs 17, 18 can be configured as M12 and M8 plug connectors. The plug 17 has a current and voltage supply connection, two switching outputs, which can be programmed as break contacts or make contacts for the pre-alarm and the main alarm, and a signal input for an external signal, which corresponds to the current rpm. The plug 18 has a signal input for an external signal and a current and voltage supply output via which an external sensor can be supplied. Moreover, the vibration sensor 1 can also be connected via the plug 17 to a computer, especially a PC, the parameterization data can then be transmitted as data packets from the PC. This data transfer can take place, besides via a RS-232 interface, for example, also via a RS 485 interface.

The adjustable parameters can include characteristic data of the bearings, operating data of the system or machine, and boundary values. The characteristic data of the bearings can include the number of roller bodies, i.e., of balls, grooves or barrel roller bodies, the roller body diameter, and the diameter of the inside ring of the bearing and of the outside ring of the bearing. These individual parameters can be input, either manually on the PC or can be made available automatically from a database, by specification of the bearing manufacturer and the bearing identification number. Moreover, at the operating rpm or at the variable rpm, the possible rpm range, the manner in which the rpm are made available, the boundary values, and the setting of the switching outputs (break contact or make contact) can also be set in the parameterization mode.

FIG. 1 shows that the evaluation electronics 4 having two memories 19, 20, wherein in the memory 19, the set parameter values, and boundary values, as well as the current operating data is stored, and the memory 20 acts as a history memory in which the state values, which have been determined by the vibration sensor 1, are continuously stored.

Figure 4:
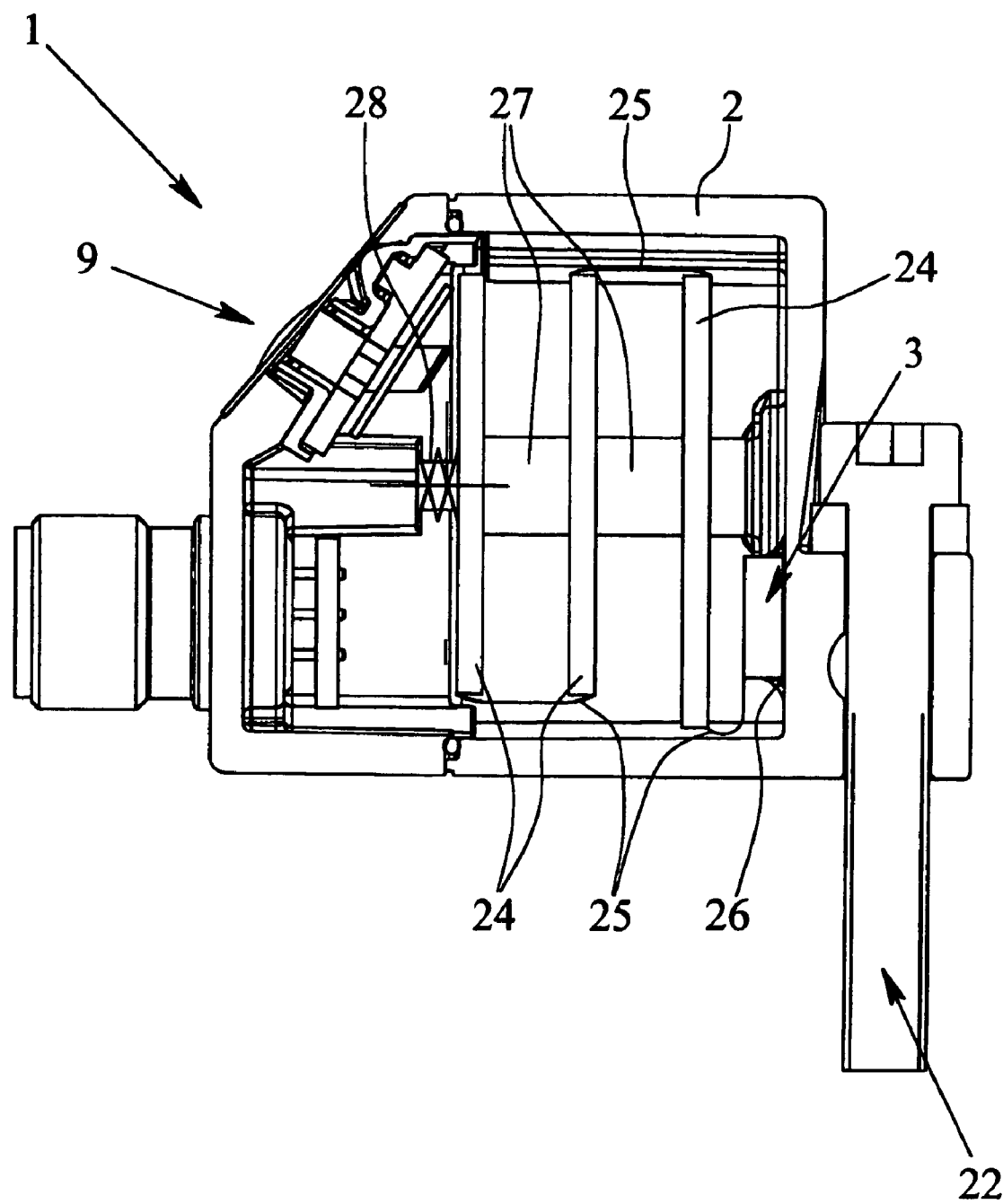
FIG. 4 shows an embodiment of the vibration sensor as claimed in the invention, in a section.

FIGS. 2 to 4 show that the vibration sensor 1 is made substantially cuboidal in shape, and preferably having a very compact design, for example, having an edge length of less than five centimeters, with the front side of the housing 2 having a beveled top side 21 in which the display means 9 is integrated. In this way, both the operability of the control elements 11, 12, 13 and also the readability of the display 10 are facilitated or enhanced. The mounting of the illustrated vibration sensor 1 on a machine or system, which is to be monitored, takes place via a screw connection 22, but can also be implemented by cementing. As shown in FIG. 2, the display 10 includes labeling fields 23, which, on the one hand, symbolize the progress of the damage state for the display via the yellow LEDs 15, and on the other hand, enable assignment of the individual red LED 16 to the individual bearings.

FIG. 4 shows that the sensor element 3 is located on a circuit board, which includes three rigid segments 24 and three flexible segments 25. Such circuit board construction is also often called a rigid-flexible circuit board. The sensor element 3 is attached by means of a low-attenuation cement 26 in the vicinity of the mounting site of the vibration sensor 1, i.e., in the vicinity of the screw connection 22, within the housing 2. Because the sensor element 3 is separated from the remaining circuit board construction by the flexible segment 25, which is made as a conductor film, the sensor element 3 is decoupled in terms of vibration technology from the remainder of the circuit board construction. Thus, advantageously, superposition of natural vibrations of the vibration sensor 1 onto the sensor element 3 are for the most part avoided. Finally, FIG. 4 shows that the rigid-flexible circuit board construction is screwed securely using spacers 27 and disk springs 28 within the housing 2.

The invention claimed is:

1. A vibration sensor for monitoring the state of rotating components or bearings, comprising:
    a sensor element;
    evaluation electronics; and
    at least one interface, wherein the evaluation electronics includes an analog-to-digital converter and a signal conditioning means, and
    a display means with a display for displaying
    wherein the sensor element, the evaluation electronics, and the interface are located in a common housing, and
    wherein the signal conditioning means is adapted for receiving a plurality of signals acquired by the sensor element and for converting said signals into a state value using signal analysis and a diagnosis algorithm;
    wherein said display means is adapted for displaying the state value;
    wherein the at least one interface has first and second switching outputs, a parameterization input, and a current and voltage supply input; and
    wherein the first switching output is configured for triggering a pre-alarm, and the second switching output is configured for triggering a main alarm.

2. The vibration sensor of claim 1, further comprising at least one control element for at least one of parameter input, setting boundary values and choosing an operating mode, and wherein the display comprises a color display, including green, yellow, and red color values.

3. The vibration sensor of claim 2, wherein the control element can be locked or blocked mechanically and/or electronically.

4. The vibration sensor of claim 2, wherein the sensor element is located on a circuit board which has at least one rigid segment and at least one flexible segment; and wherein the sensor element is mounted in the common housing near a mounting site of the vibration sensor having low attenuation.

5. The vibration sensor of claim 2, wherein the common housing is substantially cuboidal and has a beveled top side, and the display means is integrated in the beveled top side; and the common housing is made of metal or plastic and provides at least an IP 65 degree of protection.

6. The vibration sensor of claim 1, wherein the at least one interface includes first and second interfaces, the first and/or the second interface has one signal input for receiving a signal from an external sensor, and the second interface has a current and voltage supply output for outputting to an external sensor, including a proximity switch.

7. The vibration sensor of claim 1, further comprising at least one memory connected to the evaluation electronics, wherein at least one of parameter values and boundary values are stored in the memory; and wherein the evaluation electronics has a self-learning logic.

8. The vibration sensor of claim 1, wherein a state value of a component or of a bearing with a highest degree of damage or poorest state value is at the switching output.

9. The vibration sensor of claim 1, wherein the sensor element comprises a biaxial acceleration sensor; and wherein the biaxial acceleration sensor is located at an angle of 45 degrees to a surface normal on the circuit board, and output signals of two channels of an acceleration signal are added.

10. Process for monitoring the state of rotating components or bearings with a vibration sensor which has a sensor element and evaluation electronics, comprising the steps of:
    continuously or quasi-continuously acquiring signals with the sensor element;
    converting said signals into a state value reflective of the state of the monitored component or bearing using signal analysis and a diagnosis algorithm, the signal analysis taking place both in the time domain and also in the frequency domain, and computing dynamic quantitative averages and/or peak values the time domain;
    continuously storing state values; and
    computing an expected time interval based on previously determined state values, including a remaining service life, until occurrence of damage that adversely affects serviceability of the rotating component and/or of the bearing.

11. The process of claim 10, further comprising performing the signal analysis based on a Fourier transform (FT), a fast Fourier transform (FFT), or an envelope curve fast Fourier transform (HFFT).

12. The process of claim 10, further comprising manipulating in the frequency domain values which are supplied to the signal analysis, including at least one of weighting filtering, windowing and modulating individual signals; and variably setting boundary values of the filtering depending on operating conditions.

13. The process of claim 12, wherein the diagnosis algorithm takes place depending on at least one of stored and computed parameterization data and boundary values; wherein the diagnosis algorithm is used to combine individual signals into characteristic values; wherein the characteristic values are compared to the boundary values; and wherein individual signals are weighted according to the relevance of the individual signals.

14. The process of claim 13, further comprising the step of combining the individual characteristic values into a state value with consideration of different weighting and with consideration of an operating state.

15. The process of claim 13, further comprising automatically generating the parameterization data from at least one of a graphic and tabular model description of the machine, components or bearings to be monitored; and inputting the parameterization data via an input unit, including a computer or PC.

16. The process of claim 10, further comprising the step of subjecting at least one of characteristic values and the state value to plausibility checking so that measurement errors are recognized and do not lead to a faulty state value.

17. The process of claim 10, further comprising automatically computing the boundary values in a teach-in mode depending on the parameterization data and the current operating conditions.

18. The process of claim 17, further comprising:
    computing in the teach-in mode the boundary values depending on the parameterization data at an operating rpm; and
    automatically computing the boundary values at another rpm using self-learning evaluation logic.

19. The process of claim 10, further comprising determining a response characteristic between the rotating component or the bearing and the vibration sensor at a start of monitoring of the state.

20. The process of claim 19, further comprising:
feeding at least one defined pulse in a three-dimensional vicinity of the rotating component or the bearing into a machine; and
determining the response characteristic from a signal which has been measured by the vibration sensor.

21. The process of claim 10, further comprising automatically matching the boundary values to a respective rpm.

22. The process of claim 21, further comprising:
automatically detecting and measuring the rpm; and
subjecting the automatically detected and measured rpm to plausibility checking so that an error in the determination of the rpm can be detected and corrected.

* * * * *